US012681677B2

(12) United States Patent
Sugiyama

(10) Patent No.: US 12,681,677 B2
(45) Date of Patent: Jul. 14, 2026

(54) DISPLAY SYSTEM, DISPLAY METHOD, AND RECORDING MEDIUM ON WHICH DISPLAY PROGRAM IS RECORDED

(71) Applicant: SHARP KABUSHIKI KAISHA, Sakai City (JP)

(72) Inventor: Koichi Sugiyama, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/183,932

(22) Filed: Apr. 21, 2025

(65) Prior Publication Data

US 2025/0383829 A1     Dec. 18, 2025

(30) Foreign Application Priority Data

Jun. 17, 2024    (JP) ................................. 2024-097378

(51) Int. Cl.
*G06F 3/14*          (2006.01)
*G06F 9/445*         (2018.01)

(52) U.S. Cl.
CPC ........ *G06F 3/1454* (2013.01); *G06F 9/44505* (2013.01)

(58) Field of Classification Search
CPC .......................... G06F 3/1454; G06F 9/44505
See application file for complete search history.

(56) References Cited

U.S. PATENT DOCUMENTS

| | | | | |
|---|---|---|---|---|
| 8,803,817 B1 * | 8/2014 | Froment | ............. | G06F 15/0291 345/184 |
| 11,455,174 B2 | 9/2022 | Sugiyama | | |
| 12,079,044 B2 * | 9/2024 | Lee | ........................ | G06F 1/1677 |
| 2010/0066763 A1 * | 3/2010 | Macdougall | .......... | G06F 1/1626 345/656 |
| 2014/0015743 A1 * | 1/2014 | Seo | ......................... | G06F 3/017 345/156 |
| 2014/0267102 A1 * | 9/2014 | Ota | ....................... | G06F 3/0425 345/173 |
| 2016/0109969 A1 * | 4/2016 | Keating | ............. | G06F 3/03547 345/173 |
| 2018/0024806 A1 * | 1/2018 | Fujino | ................... | G06F 3/1423 345/1.1 |
| 2019/0205275 A1 | 7/2019 | Renard et al. | | |
| 2023/0046864 A1 * | 2/2023 | Venkataraman | ........ | H04L 69/18 |

FOREIGN PATENT DOCUMENTS

| | | | |
|---|---|---|---|
| JP | 2021-513768 A | 5/2021 | |
| JP | 7444728 B2 | 3/2024 | |

OTHER PUBLICATIONS

Low, "Microsoft's Windows 10 S attempts to retake the classroom", CNET, May 2, 2017 (Year: 2017).*
ScreenBeam Inc., "ScreenBeam Classroom Commander for Windows 10 Classrooms" (https://youtu.be/rf4zVu5ZBDM?si=NfQHzGOOHdehPV31), Jun. 23, 2017 (Year: 2017).*
Rayome, "Windows 10 vs. Windows 10 S: What's the difference?", CNET, Feb. 13, 2020 (Year: 2020).*

* cited by examiner

*Primary Examiner* — Julie Anne Watko
(74) *Attorney, Agent, or Firm* — ScienBiziP, P.C.

(57)          ABSTRACT

A display system includes a determination processing unit that determines a type of an operating system installed in a user terminal when a transmitter is connected to the user terminal, and a configuration processing unit that configures a display format of each of the user terminal and a display in a selectable state based on the type of the operating system.

8 Claims, 5 Drawing Sheets

PROJECT

PC SCREEN ONLY

COPY

EXPAND

SECOND SCREEN ONLY

FIG.4

DISPLAY SYSTEM, DISPLAY METHOD, AND RECORDING MEDIUM ON WHICH DISPLAY PROGRAM IS RECORDED

INCORPORATION BY REFERENCE

This application is based upon and claims the benefit of priority from the corresponding Japanese Patent Application No. 2024-097378 filed on Jun. 17, 2024, the entire contents of which are incorporated herein by reference.

BACKGROUND

The present disclosure relates to a technique for causing display content of a display device to be displayed on another display device.

In the related art, a system is known in which display content of a display device is displayed (duplicated display, enlarged display, or the like) on another display device by using wireless communication. For example, a system is known in which when software is executed on a computer by a user operation in a state where a first peripheral device (dongle or the like) is connected to the computer, captured data such as visual data or audio data can be shared with other users.

In known systems, for example, when a first display device and a second display device become ready for data communication, the display content of the first display device is displayed on the second display device. Thus, for example, in a case where the display content of the first display device is information with a high security level such as confidential information, a problem in this case is that the display content is leaked without the intention of the user of the first display device.

SUMMARY

An object of the present disclosure is to provide a display system, a display method, and a recording medium on which a display program is recorded, which are capable of preventing, when the display content of a first display device is caused to be displayed on a second display device, the display content from being leaked without intention of a user.

A display system according to an aspect of the present disclosure is a display system capable of displaying display content of a first display device on a second display device via a transmitter connected to the first display device. The display system includes a determination processing unit that determines a type of an operating system installed in the first display device in a case where the transmitter is connected to the first display device, and a configuration processing unit that configures a display format of each of the first display device and the second display device in a selectable state, based on the type of the operating system.

A display method according to another aspect of the present disclosure is a method capable of displaying display content of a first display device on a second display device via a transmitter connected to the first display device. The display method is a method in which, in a case where the transmitter is connected to the first display device, one or more processors execute determining a type of an operating system installed in the first display device, and configuring a display format of each of the first display device and the second display device in a selectable state, based on the type of the operating system.

A recording medium according to another aspect of the present disclosure is a recording medium on which a program capable of displaying display content of a first display device on a second display device via a transmitter connected to the first display device is recorded. The display program is a program for causing one or more processors to execute, in a case where the transmitter is connected to the first display device, determining a type of an operating system installed in the first display device, and configuring a display format of each of the first display device and the second display device in a selectable state, based on the type of the operating system.

According to the present disclosure, a display system, a display method, and a recording medium on which a display program is recorded can be provided, which are capable of preventing display content from being leaked without intention of a user when the display content of a first display device is caused to be displayed on a second display device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of a selection screen displayed on a user terminal according to the embodiment of the present disclosure.

FIG. 4 is a diagram illustrating an example of the selection screen displayed on the user terminal according to the embodiment of the present disclosure.

DETAILED DESCRIPTION

Embodiments of the present disclosure will be described below with reference to the drawings. Note that the following embodiments are specific examples of the present disclosure, and do not limit the technical scope of the present disclosure.

Figure 1:
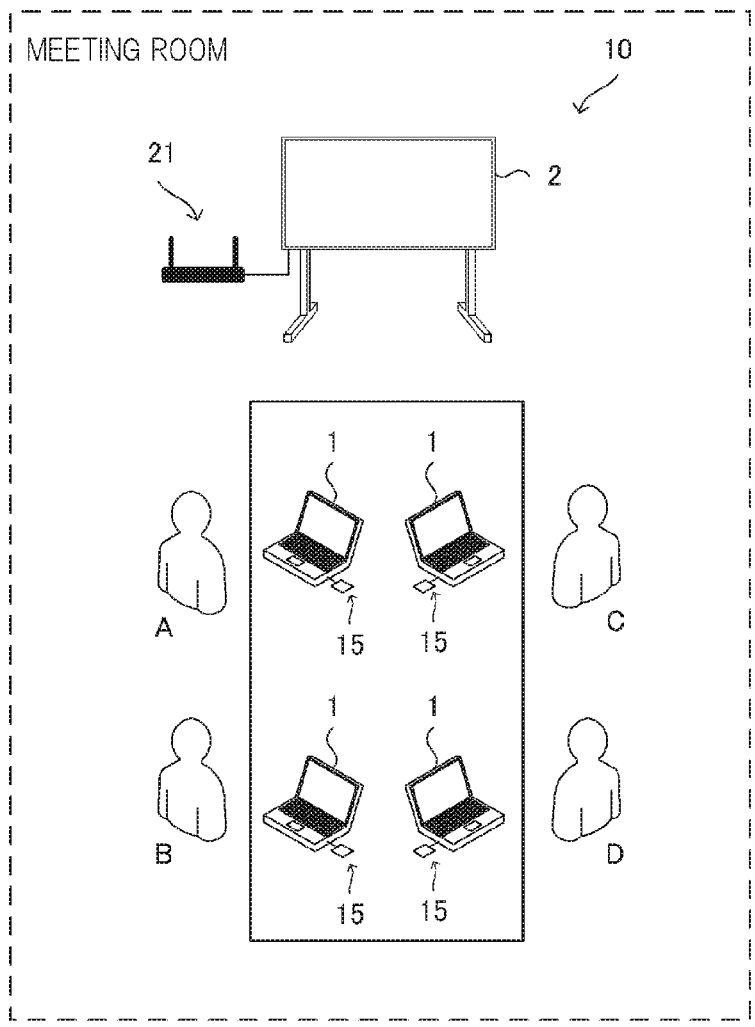
FIG. 1 is a diagram illustrating an application example of a display system according to an embodiment of the present disclosure.

A display system according to the present disclosure can be applied to, as illustrated in FIG. 1, for example, a case where, in the same space (for example, a meeting room), multiple users hold a meeting by using respective user terminals 1 and displaying screens of meeting materials on a display 2 installed in the meeting room. Note that the display system can also be applied to an online meeting in which multiple spaces are connected via a network and users in the respective spaces hold a meeting. Note that, in the example illustrated in FIG. 1, multiple user terminals 1 are arranged in the meeting room, but one user terminal 1 may be arranged in the meeting room.

For example, as illustrated in FIG. 1, users A to D participate in the meeting in the meeting room by using respective user terminals 1. The user terminal 1 is an information processing device (an example of a first display device of the present disclosure) such as a personal computer or a mobile terminal. A dongle-type transmitter 15 capable of wireless communication that can be attached to and detached from the user terminal 1. The display 2 is a display device (an example of a second display device of the present disclosure) that displays a screen based on data transmitted from the user terminal 1. A receiver 21 capable of wireless communication is connected to the display 2. For example, by connecting the transmitter 15 to the user terminal 1, the user A can perform data communication with the display 2 via the receiver 21 and can display, on the display 2, a screen displayed on the user terminal 1 of the user A. Similarly, by connecting the transmitter 15 to the user terminal 1, the user B can perform data communication with the display 2 via the receiver 21 and can display, on the display 2, a screen displayed on the user terminal 1 of the user B. The display 2 may be capable of displaying one screen displayed on any of the user terminals 1 of the users A to D, or may be capable of simultaneously displaying four screens displayed on the user terminals 1.

The display system 10 according to the present embodiment has a configuration that prevents the display content of the user terminal 1 from being leaked without the intention of the user when display content of the user terminal 1 is caused to be displayed on the display 2 in a usage scene as described above. A specific configuration will be described below.

The display system 10 includes a user terminal 1 and a display 2, and is a display system capable of displaying display content of the user terminal 1 on the display 2 via a transmitter 15 connected to the user terminal 1.

Figure 2:
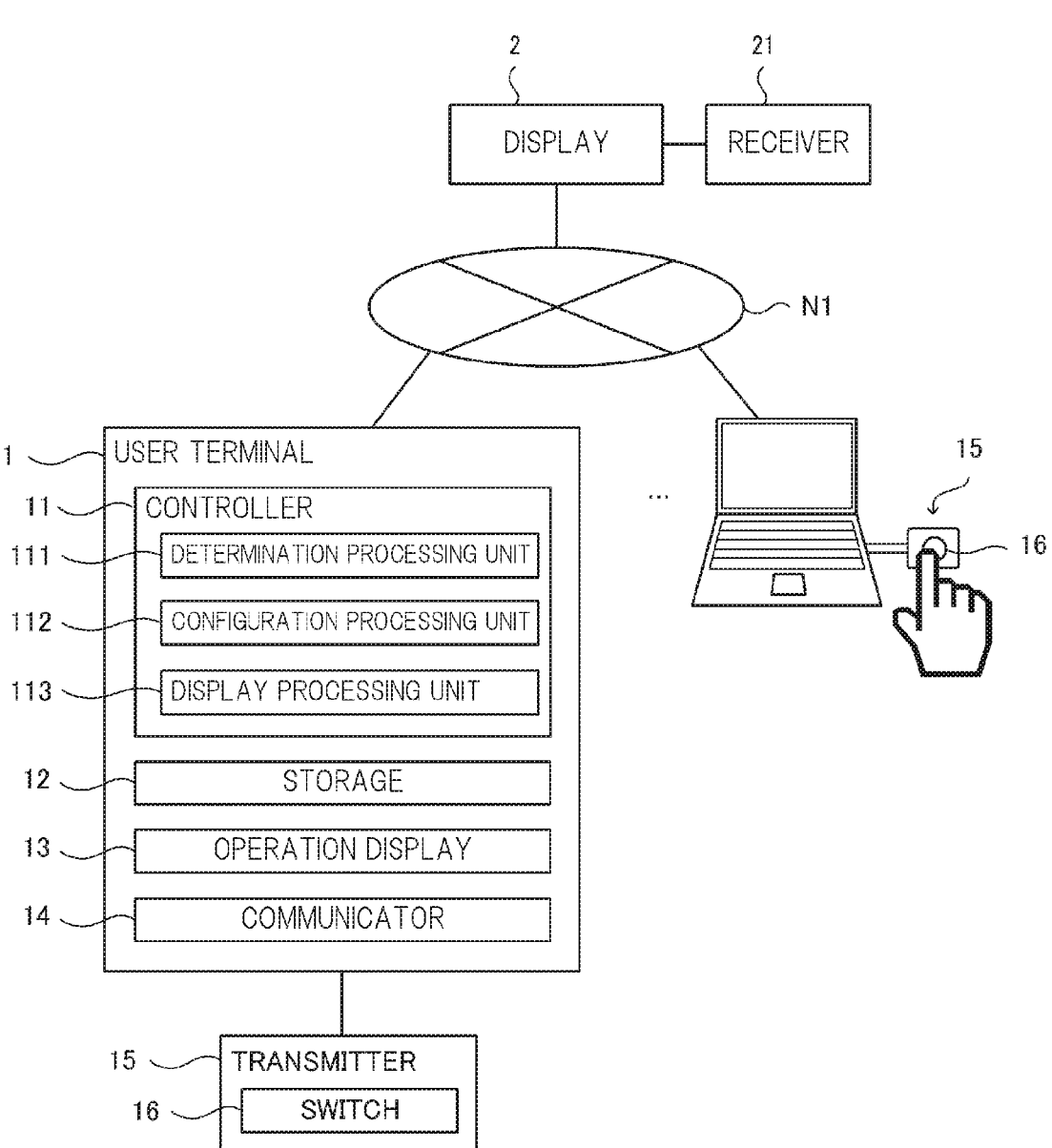
FIG. 2 is a block diagram illustrating a configuration of the display system according to the embodiment of the present disclosure.

As illustrated in FIG. 2, in the display system 10, the user terminal 1 and the display 2 are data-communicably connected to each other via a network N1. The transmitter 15 is connected to the user terminal 1, and the receiver 21 is connected to the display 2. The transmitter 15 is, for example, a universal serial bus (USB) dongle-type wireless transmitter. The receiver 21 may be built in the display 2.

The user terminal 1 is an information processing device including a controller 11, a storage 12, an operation display 13, a communicator 14, and the like, and is, for example, a notebook PC.

The communicator 14 connects the user terminal 1 to the network N1 via the transmitter 15 to execute data communication with external equipment such as the display 2 in accordance with a predetermined communication protocol.

The operation display 13 is a user interface including a display such as a liquid crystal display or an organic EL display that displays various types of information, and an operation inputter such as a mouse, a keyboard, or a touch panel that receives an operation.

The storage 12 is a non-volatile storage such as a hard disk drive (HDD), a solid state drive (SSD), or a flash memory that stores various types of information. The storage 12 stores data such as meeting materials.

The storage 12 stores a control program such as a display program (an example of the display program of the present disclosure) for causing the controller 11 to execute display processing described below (see FIG. 5). For example, the display program may be non-temporally recorded in a computer-readable recording medium such as a CD or a DVD, read by a reading device (not illustrated) such as a CD drive or a DVD drive included in the user terminal 1, and stored in the storage 12.

The controller 11 includes control equipment such as a central processing unit (CPU), a read only memory (ROM), and a random access memory (RAM). The CPU is a processor that executes various types of arithmetic processing. The ROM is non-volatile storage that stores, in advance, control programs such as a basic input/output system (BIOS) and an operating system (OS) for causing the CPU to execute various types of calculation processing. The RAM is a volatile or non-volatile storage that stores various types of information and is used as a temporary storage memory (work area) for the various types of processing executed by the CPU. Then, the controller 11 controls the user terminal 1 by causing the CPU to execute various types of the control programs stored in advance in the ROM or the storage 12.

Specifically, as illustrated in FIG. 2, the controller 11 includes various processing units such as a determination processing unit 111, a configuration processing unit 112, and a display processing unit 113. Note that the controller 11 functions as the various types of processing units by executing various types of processing in accordance with the control program using the CPU. Some or all of the processing units may be constituted by an electronic circuit. Note that the control programs may be programs for causing multiple processors to function as the above-described processing units.

In a case where the transmitter 15 is connected to the user terminal 1, the determination processing unit 111 determines the type of the operating system (OS) installed in the user terminal 1.

Here, the user terminal 1 is equipped with a predetermined operating system (OS), and realizes functions of the equipment by the OS. The OS is classified into multiple types such as Windows, Mac, Android, and Linux (all are trade names). Each OS includes multiple OSs different for each version.

Normally, in a case where the display screen of the user terminal 1 is displayed (copied, expanded, or the like) on the external display (the display 2), a selection screen P1 (see FIG. 3) for switching the screen display is displayed, and a selection operation by the user is received on the selection screen P1. A method of displaying the selection screen P1 on the user terminal 1 varies depending on the OS. In the present embodiment, in order to display the selection screen P1, the determination processing unit 111 executes OS type determination processing in a case where the transmitter 15 is connected to the user terminal 1.

Specifically, the determination processing unit 111 determines the type of the OS based on a communication parameter acquired from the communicator that performs data communication with the user terminal 1 according to a predetermined communication standard. A specific example of the OS type determination processing will be described later.

The configuration processing unit 112 configures the display format of each of the user terminal 1 and the display 2 in a selectable state based on the type of the OS determined by the determination processing unit 111. In an example described below, the type of the OS determined by the determination processing unit 111 is "Windows".

The configuration processing unit 112 causes the selection screen P1 corresponding to the type of the OS to be displayed on the user terminal 1, and receives, on the selection screen P1, an operation of selecting the display format of each of the user terminal 1 and the display 2. The configuration processing unit 112 assigns a function of selecting a display format according to the type of the OS, to the switch 16 (an example of an operation inputter of the present disclosure) provided in the transmitter 15, and receives, at the switch 16, the operation of selecting the display format of each of the user terminal 1 and the display 2.

Figure 3:
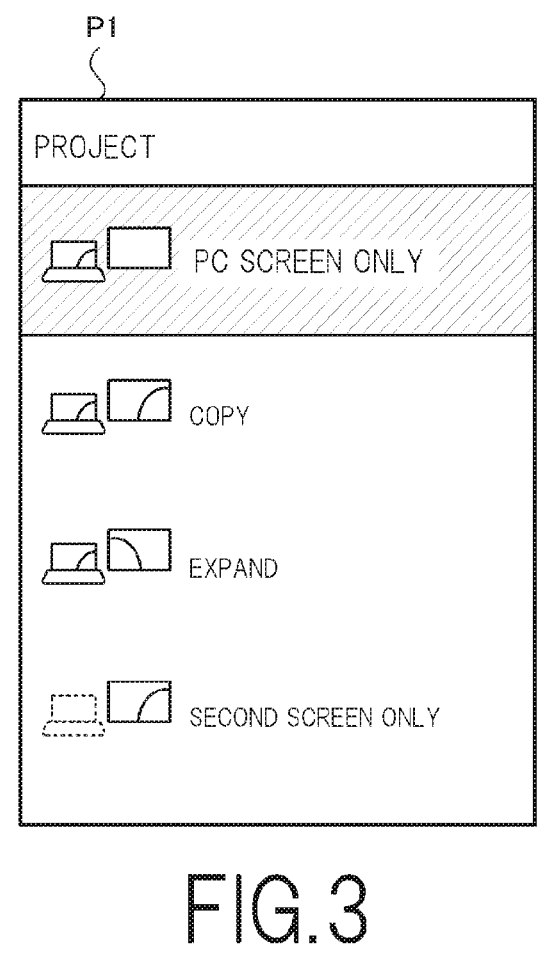

For example, when the user A connects the transmitter 15 to the user terminal 1, the controller 11 recognizes the transmitter 15 as external equipment such as an external display, and the determination processing unit 111 executes the OS type determination processing. Thereafter, when the user A presses the switch 16 of the transmitter 15, the configuration processing unit 112 causes the user terminal 1 to display the selection screen P1. As illustrated in FIG. 3, the selection screen P1 includes a display mode for displaying a screen only on the user terminal 1 ("PC-screen only"), a display mode for displaying, on the display 2, the same screen as the display screen of the user terminal 1 ("copy"), a display mode for expanding the display screen of the user terminal 1 and displaying the expanded display screen on the display 2 ("expansion"), and a display mode for displaying a screen only on the display 2 ("second screen").

Figure 4:
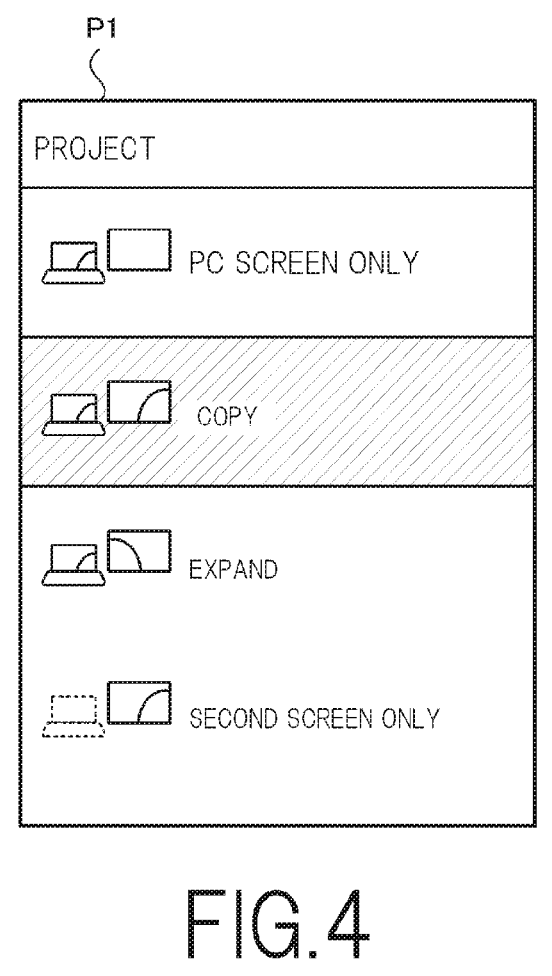

The configuration processing unit 112 assigns, to the switch 16, a function of selecting each display mode (display format) of the selection screen P1. Accordingly, for example, upon pressing the switch 16 of the transmitter 15 connected to the user terminal 1 in a state in which the selection screen P1 is displayed on the user terminal 1, the user A can select a desired display mode or switch the display mode. For example, each time the user presses the switch 16, the selection range moves. FIG. 3 shows a state where the user A presses the switch 16 to select "copy". Note that the configuration processing unit 112 may determine a selection target of the display mode in a case where the position of the selection range continues for a predetermined time. For example, in a case where the user A presses the switch 16 once in the state illustrated in FIG. 3, the selection range may move to the state illustrated in FIG. 4, and in a case where this state continues for a predetermined time, the configuration processing unit 112 may determine "copy". As another embodiment, the configuration processing unit 112 may determine the selection target in a case of receiving a holding-down operation of the switch 16.

The display processing unit 113 controls the respective display screens of the user terminal 1 and the display 2 based on the selected display format. Specifically, when the display format for causing the display content of the user terminal 1 to be displayed on the display 2 is selected, the display processing unit 113 causes the display content of the user terminal 1 to be displayed on the display 2.

For example, when the user A selects "PC screen only", the display processing unit 113 does not cause the display content of the user terminal 1 to be displayed on the display 2.

For example, in a case where the user A selects "copy", the display processing unit 113 causes the same content as the display content of the user terminal 1 to be displayed on the display 2.

For example, in a case where the user A selects "expand", the display processing unit 113 causes the display content of the user terminal 1 to be expanded and displayed on the display 2.

For example, in a case where the user A selects "second screen", the display processing unit 113 causes display to be performed only on the display 2 and does not cause display to be performed on the user terminal 1.

As described above, in the display system 10, the configuration processing unit 112 causes the selection screen P1 corresponding to the type of the OS to be displayed on the user terminal 1 in a case where the transmitter 15 is connected to the user terminal 1, and the display processing unit 113 causes the display content of the user terminal 1 to be displayed on the display 2 in a case where the display format for displaying the display content of the user terminal 1 on the display 2 is selected. That is, the display content of the user terminal 1 is not displayed on the display 2 simply by connecting the transmitter 15 to the user terminal 1, and the display content of the user terminal 1 can be displayed on the display 2 on condition that a user operation on the transmitter 15 is received. This enables prevention of such a problem that the display content is displayed on the display 2 without the intention of the user when the user terminal 1 and the display 2 enter a data communication enabled state.

Display Processing

Figure 5:
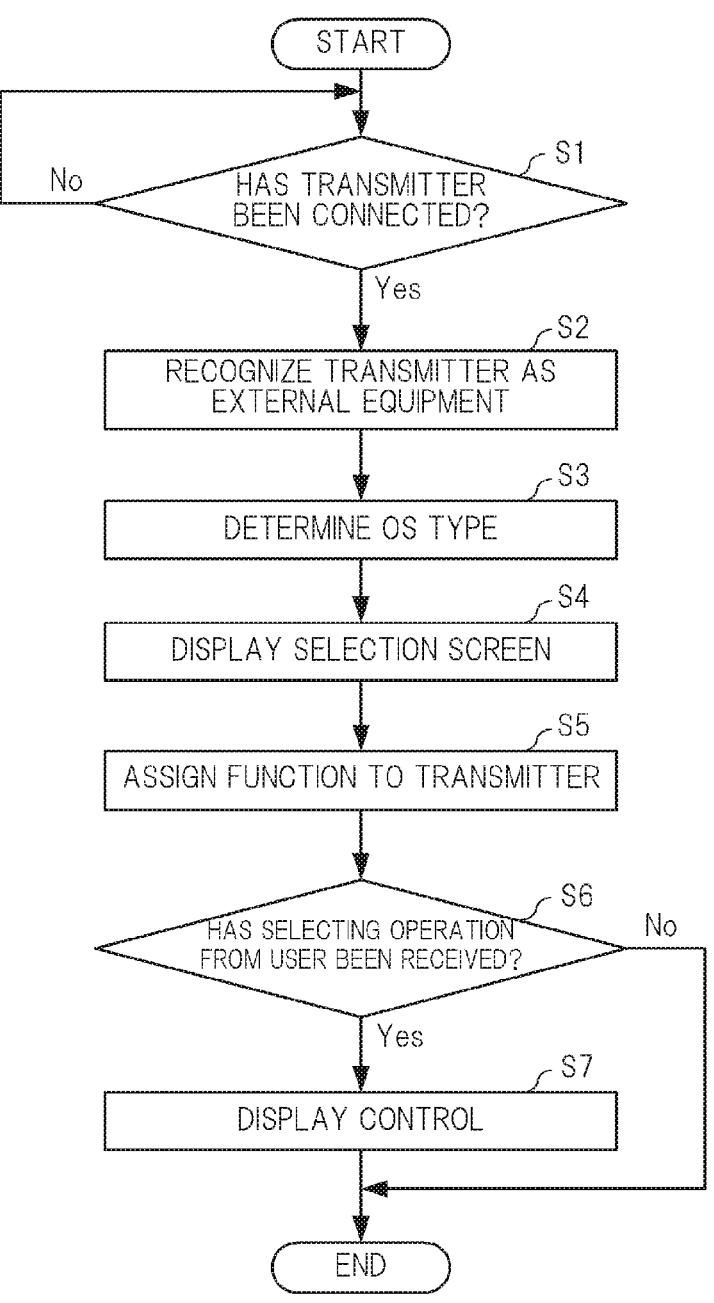
FIG. 5 is a flowchart for explaining an example of a procedure of display processing executed in the display system according to the embodiment of the present disclosure.

FIG. 5 illustrates an example of a procedure of display processing executed by the display system 10.

Note that the present disclosure can be regarded as a display method (the display method of the present disclosure) that executes one or more steps included in the display processing. One or more steps included in the display processing described herein may be omitted as appropriate. The steps of the display processing may be executed in a different order to the extent that similar effects are obtained. Furthermore, in the example described herein, the controller 11 of the user terminal 1 executes each of the steps of the display processing, but in another embodiment, one or more processors may execute the steps of the display processing in a distributed manner.

In an example described below, as illustrated in FIG. 1, the users A to D hold a meeting in a meeting room by using the respective user terminals 1 and a shared external display (display 2). The receiver 21 is assumed to be connected to the display 2, which is assumed to have been activated by operation of the user. Each user terminal 1 is assumed to have been activated by operation of each user. Each user terminal 1 displays meeting materials and the like. Hereinafter, display processing in the user terminal 1 of the user A will be described as an example. The other user terminals 1 also execute similar processing.

<Step S1>

In step S1, the controller 11 of the user terminal 1 of the user A determines whether the transmitter 15 is connected to the user terminal 1. For example, when the meeting is started, the user A connects the transmitter 15 to the user terminal 1 in order to enable communication between the user terminal 1 and the display 2. Upon determining that the transmitter 15 has been connected to the user terminal 1 (S1: Yes), the controller 11 transitions the processing to step S2. The controller 11 waits until the transmitter 15 is connected to the user terminal 1 (S1: No).

<Step S2>

In step S2, the controller 11 recognizes the transmitter 15 as external equipment (for example, an external display).

<Step S3>

In step S3, the controller 11 determines the type of the OS installed in the user terminal 1. For example, the controller 11 determines Windows, Mac, Android, Linux, or the like as the OS type. Here, the controller 11 is assumed to determine that the OS type is "Windows".

<Step S4>

In step S4, the controller 11 causes the user terminal 1 to display the selection screen P1 corresponding to the OS type. Here, the controller 11 displays the selection screen P1 corresponding to "Windows" illustrated in FIG. 3. The controller 11 may display the selection screen P1 in a pop-up manner on the screen of the meeting materials displayed after the user terminal 1 is activated. At this time point, the meeting materials are not displayed on the display 2.

<Step S5>

In step S5, the controller 11 assigns a function of selecting a display format (display mode) to the switch 16 of the transmitter 15. For example, the controller 11 assigns an operation of selecting from and switching among four display modes of "PC screen only", "copy", "expand", and "second screen". Thus, the user A can select or switch the display mode by pressing the switch 16.

<Step S6>

In step S6, the controller 11 determines whether the controller 11 has received a selection operation from the user. When the user presses the switch 16, the controller 11 receives the selection operation. Upon receiving the selection operation from the user (S6: Yes), the controller 11 transitions the processing to step S7. On the other hand, in a case of not receiving the selection operation from the user (S6: No), the controller 11 ends the display processing.

<Step S7>

In step S7, the controller 11 controls the display screen of each of the user terminal 1 and the display 2 based on the selected display mode.

As described above, the controller 11 executes the display processing. The user terminals 1 can execute the display processing in parallel, and the display 2 displays a screen in accordance with a display instruction from each user terminal 1.

OS Type Determination Processing

The determination processing unit 111 determines the OS type based on the communication parameter acquired from the communicator that performs data communication with the user terminal 1 according to a predetermined communication standard. Specifically, the determination processing unit 111 can adopt the OS type determination processing described in Japanese Patent No. 7444728 according to the disclosure of the present inventor. The publication describes a configuration in which an OS type determination processing unit of a touch panel device determines the type of an OS installed in a computer main body.

Specifically, the OS type determination processing unit (corresponding to the determination processing unit of the present disclosure) performs first classification and determines the type of the OS based on a predetermined communication parameter acquired from an Ether communication control circuit board. For example, the OS type determination processing unit determines the type of the OS corresponding to a TTL value acquired from the Ether communication control circuit board.

For example, when the power supply of the computer system is turned on, the control device detects a terminal of a connection destination by a Ping command through LAN communication (TCP/IP protocol communication) between the Ether communication control circuit board of the computer main body and the Ether communication control circuit board of the touch panel device. Specifically, the control device executes the Ping command in the TCP/IP protocol to receive an echo response message from the computer main body. The control device acquires the TTL value included in the echo response message and determines the type of the OS corresponding to the TTL value. Time to live (TTL) refers to a timer value included in a packet to be transmitted when terminals are connected via a LAN and is an index indicating the stability of a communication path.

Each time the packet passes through a relay device (L3 level) in the middle of the communication path, the value is decremented by one. When the value becomes 0, the packet is discarded (communication is disabled). The TTL value is a standard varying among the OSs, and thus the OS can be classified based on the TTL value.

For example, in a case where the TTL value ranges from "62 to 64", the OS type determination processing unit determines that the OS is any one of "Linux/Mac/Android". In a case where the TTL value ranges from "126 to 128", the OS type determination processing unit determines that the OS is "Windows". When the TTL value ranges from "253 to 255", the OS type determination processing unit determines that the OS is "other".

Here, in a case where the TTL value ranges from "62 to 64", the OS type determination processing unit further determines the type of the OS based on a communication parameter acquired from a USB communication control circuit board. For example, the OS type determination processing unit determines whether the OS is "Mac" or "Android" based on "Set Feature Report" and "Device Mode", which are control parameters for controlling the operation mode (touch mode) of the touch panel. Specifically, in a case where the control parameter does not include "Set Feature Report", the OS type determination processing unit determines that the OS is "MacOS version 10.15". In a case where the control parameter includes "Set Feature Report" and the "Device Mode" is "multi-touch mode", the OS type determination processing unit determines that the OS is "Android". In a case where the control parameter includes "Set Feature Report" and the "Device Mode" is not "multi-touch mode", the OS type determination processing unit determines that the OS is "MacOS version to 10.14".

As described above, the OS type determination processing unit determines the type of the OS based on the first communication parameter (TTL value) acquired from the Ether communication control circuit board, and further determines the type of the OS based on the communication parameter ("Set Feature Report", "Device Mode") acquired from the USB communication control circuit board. The TTL value, "Set Feature Report", and "Device Mode" are examples of communication parameters of the present disclosure.

The display system 10 according to the present disclosure can determine the type of the OS of the user terminal 1 by adopting the above-described OS type determination processing. Note that the method of determining the type of the OS is not limited to the above-described one, and any other well-known method may be employed.

As described above, the display system 10 according to the present disclosure is a system capable of displaying the display content of the user terminal 1 (first display device) on the display 2 (second display device) via the transmitter 15 connected to the user terminal 1. In a case where the transmitter 15 is connected to the user terminal 1, the display system 10 determines the type of the operating system (OS) installed in the user terminal 1 and configures the display format (display mode) of each of the user terminal 1 and the display 2 in a selectable state based on the type of the OS. To be specific, in a case where the transmitter 15 is connected to the user terminal 1, the display system 10 causes the selection screen P1 (see FIGS. 3 and 4) corresponding to the type of the OS to be displayed on the user terminal 1, and in a case where the display format (for example, "copy", "expand", or "second screen") is selected in which the display content of the user terminal 1 is displayed on the display 2, the display system 10 causes the display content of the user terminal 1 to be displayed on the display 2.

According to the above-described configuration, for example, the display content of the user terminal 1 is not displayed on the display 2 simply by configuring the user terminal 1 and the display 2 in a communicable state, and the display content of the user terminal 1 can be displayed on the display 2 on condition that a user operation is performed on the transmitter 15 connected to the user terminal 1. Thus, when caused to be displayed on the display 2, the display content of the user terminal 1 can be prevented from being leaked without the intention of the user. When the transmitter 15 is connected to the user terminal 1, the switch 16 of the transmitter 15 is assigned with the function of selecting the display format corresponding to the type of the OS of the user terminal 1, for example, the function of selecting "PC screen only", "copy", "expand", and "second screen" corresponding to "Windows". Thus, simply by pressing the switch 16, the user can select or switch the desired display mode without concern for the type of the OS of the user terminal 1 of the user (see FIGS. 3 and 4).

In the embodiment described above, the controller 11 (the determination processing unit 111, the configuration processing unit 112, and the display processing unit 113) of the user terminal 1 is configured to execute each processing operation. However, as another embodiment, each processing unit of the controller 11 may be provided in a server. The server may integrally control each user terminal 1. For example, the server may determine the OS type of each user terminal 1, cause the selection screen P1 to be displayed on the user terminal 1 to which the transmitter 15 is connected, receive a user operation on the selection screen P1, and perform display control of the user terminal 1 and the display 2 according to the user operation. In this case, the server may include a cloud server, and each user terminal 1 may be configured to be able to perform data communication with the server via the Internet or the like.

Supplementary Notes of Disclosure

Hereinafter, an outline of the disclosure extracted from the above-described embodiments will be described as supplementary notes. Note that configurations and processing functions described in the following supplementary notes can be selected and combined as desired.

Supplementary Note 1

A display system capable of displaying display content of a first display device on a second display device via a transmitter connected to the first display device, the display system including:

a determination processing circuit that determines a type of an operating system installed in the first display device in a case where the transmitter is connected to the first display device; and a configuration processing circuit that configures a display format of each of the first display device and the second display device in a selectable state based on the type of the operating system.

Supplementary Note 2

The display system according to Supplementary Note 1, wherein the configuration processing circuit causes a selection screen corresponding to the type of the operating system to be displayed on the first display device, and receives, on the selection screen, an operation of selecting the display format of each of the first display device and the second display device.

Supplementary Note 3

The display system according to Supplementary Note 1 or 2, wherein the configuration processing circuit assigns a function of selecting the display format corresponding to the type of the operating system for an operation inputter provided in the transmitter, and receives, at the operation inputter, an operation of selecting the display format of each of the first display device and the second display device.

Supplementary Note 4

The display system according to Supplementary Note 2 or 3, including:

a display processing circuit that controls a display screen of each of the first display device and the second display device based on the selected display format.

Supplementary Note 5

The display system according to Supplementary Note 4, wherein the display processing circuit causes the display content of the first display device to be displayed on the second display device in a case where the display format is selected in which the display content of the first display device is caused to be displayed on the second display device.

Supplementary Note 6

The display system according to Supplementary Note 4 or 5, wherein the configuration processing circuit causes the selection screen corresponding to the type of the operating system to be displayed on the first display device in a case where the transmitter is connected to the first display device, and the display processing circuit causes the display content of the first display device to be displayed on the second display device in a case where the display format is selected in which the display content of the first display device is caused to be displayed on the second display device.

Supplementary Note 7

The display system according to any one of Supplementary Notes 1 to 6, wherein the determination processing circuit determines the type of the operating system based on a communication parameter acquired from a communicator that performs data communication with the first display device in accordance with a predetermined communication standard.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display system comprising one or more processors configured to display content of a first display device on a second display device via a transmitter connected to the first display device, wherein the one or more processors are configured to:

determine a type of an operating system installed in the first display device in a case where that the transmitter is connected to the first display device, configure a display format of each of the first display device and the second display device in a selectable state based on the type of the operating system, assign a function of selecting the display format, corresponding to the type of the operating system, to an operation inputter provided in the transmitter, and receive, at the operation inputter, an operation of selecting the display format of each of the first display device and the second display device.

2. The display system according to claim 1, wherein the one or more processors are further configured to:

cause a selection screen corresponding to the type of the operating system to be displayed on the first display device, and receive, on the selection screen, the operation of selecting the display format of each of the first display device and the second display device.

3. The display system according to claim 2, wherein the one or more processors are further configured to control respective display screens of each of the first display device and the second display device based on the selected display format.

4. The display system according to claim 3, wherein the one or more processors are further configured to cause the display content of the first display device to be displayed on the second display device in a case that the selected display format is a display format in which the display content of the first display device is caused to be displayed on the second display device.

5. The display system according to claim 3, wherein the one or more processors are further configured to:

cause the selection screen corresponding to the type of the operating system to be displayed on the first display device in a case that the transmitter is connected to the first display device, and cause the display content of the first display device to be displayed on the second display device in a case that the selected display format is a display format in which the display content of the first display device is caused to be displayed on the second display device.

6. The display system according to claim 1, wherein the one or more processors are further configured to determine the type of the operating system based on a communication parameter acquired from a communicator that performs data communication with the first display device.

7. A display method executed by one or more processors configured to display content of a first display device on a second display device via a transmitter connected to the first display device, the display method comprising:

determining a type of an operating system installed in the first display device in a case that the transmitter is connected to the first display device, configuring a display format of each of the first display device and the second display device in a selectable state based on the type of the operating system, assigning a function of selecting the display format, corresponding to the type of the operating system, to an operation inputter provided in the transmitter, and receiving, at the operation inputter, an operation of selecting the display format of each of the first display device and the second display device.

8. A non-transitory computer-readable recording medium having recorded thereon one or more instructions for causing an electronic device to display content of a first display device on a second display device via a transmitter connected to the first display device, the one or more instructions, when executed by one or more processors of the electronic device, causing the one more processors to:

determine a type of an operating system installed in the first display device in a case that the transmitter is connected to the first display device, configure a display format of each of the first display device and the second display device in a selectable state based on a type of the operating system, assign a function of selecting the display format, corresponding to the type of the operating system, to an operation inputter provided in the transmitter, and receive, at the operation inputter, an operation of selecting the display format of each of the first display device and the second display device.

* * * * *